United States Patent
Rudge (10) Patent No.: US 10,697,461 B2
(45) Date of Patent: Jun. 30, 2020

(54) VACUUM PUMP LUBRICANT SUPPLY SYSTEMS

(71) Applicant: Edwards Limited, Burgess Hill, Sussex (GB)

(72) Inventor: Oliver James Rudge, Burgess Hill (GB)

(73) Assignee: Edwards Limited, West Sussex (GB)

( * ) Notice: Subject to any disclaimer, the term of this patent is extended or adjusted under 35 U.S.C. 154(b) by 424 days.

(21) Appl. No.: 15/541,820

(22) PCT Filed: Dec. 10, 2015

(86) PCT No.: PCT/GB2015/053778
§ 371 (c)(1),
(2) Date: Jul. 6, 2017

(87) PCT Pub. No.: WO2016/110666
PCT Pub. Date: Jul. 14, 2016

(65) Prior Publication Data
US 2018/0023577 A1    Jan. 25, 2018

(30) Foreign Application Priority Data
Jan. 7, 2015 (GB) .................................. 1500175.3

(51) Int. Cl.
| F04D 19/04 | (2006.01) |
| F04D 29/059 | (2006.01) |
| F04D 29/063 | (2006.01) |
| F16C 33/66 | (2006.01) |
| F16C 19/06 | (2006.01) |
| F04D 29/42 | (2006.01) |

(52) U.S. Cl.
CPC ......... F04D 19/042 (2013.01); F04D 19/044 (2013.01); F04D 29/059 (2013.01);
(Continued)

(58) Field of Classification Search
CPC .... F04D 19/042; F04D 19/044; F04D 29/059; F16C 19/06; F16C 33/6648; F16C 33/6659
(Continued)

(56) References Cited

U.S. PATENT DOCUMENTS

| 5,072,510 A | 12/1991 | Morrill |
| 2008/0112660 A1* | 5/2008 | Koch ................... F04D 19/042 384/397 |

(Continued)

FOREIGN PATENT DOCUMENTS

| EP | 2557316 A2 | 2/2013 |
| EP | 2728195 A2 | 5/2014 |

(Continued)

OTHER PUBLICATIONS

British Search Report dated Jul. 3, 2015 for corresponding British Application No. GB1500175.3.
(Continued)

*Primary Examiner* — Michael R Mansen
*Assistant Examiner* — Mark K Buse
(74) *Attorney, Agent, or Firm* — Westman, Champlin & Koehler, P.A.; Theodore M. Magee (57) ABSTRACT

A vacuum pump lubricant supply system has a lubricant reservoir and a wicking element. The body portion has opposed major surfaces and a finger. The lubricant reservoir has a major surface engaging one of the opposed major surfaces of the body portion so that lubricant can migrate through the engaging major surfaces into the body portion. The finger projects from the body portion to engage a lubricant transfer device provided on a rotor shaft so that lubricant can wick from the body portion to the lubricant transfer device via the finger. The body portion has an edge provided with a cut-out so that the major surface of the body
(Continued)

portion that engages the major surface of the lubricant container has a total surface area that is less than the total surface area of the major surface of the lubricant container.

15 Claims, 5 Drawing Sheets

(52) U.S. Cl.
CPC ............ *F04D 29/063* (2013.01); *F16C 19/06* (2013.01); *F16C 33/6648* (2013.01); *F16C 33/6659* (2013.01); *F04D 29/4206* (2013.01); *F16C 2360/45* (2013.01)

(58) Field of Classification Search
USPC ........................................................ 184/6.28
See application file for complete search history.

(56) References Cited

U.S. PATENT DOCUMENTS

| | | | | |
|---|---|---|---|---|
| 2010/0215475 | A1* | 8/2010 | Brewster | F04D 17/168 415/90 |
| 2010/0296917 | A1* | 11/2010 | Waye | F04C 25/02 415/111 |
| 2014/0356146 | A1* | 12/2014 | Mekota | F04D 29/056 415/175 |
| 2016/0097398 | A1* | 4/2016 | Waye | F04D 19/042 415/110 |
| 2017/0227055 | A1* | 8/2017 | Manabe | F04D 29/668 |
| 2018/0030990 | A1* | 2/2018 | Rudge | F16C 33/6648 |

FOREIGN PATENT DOCUMENTS

| | | |
|---|---|---|
| EP | 2808549 A1 | 12/2014 |
| GB | 2507501 A | 5/2014 |
| WO | 2006131694 A1 | 12/2006 |
| WO | 2009004378 A1 | 1/2009 |
| WO | 2014174273 A1 | 10/2014 |

OTHER PUBLICATIONS

PCT Search Report and Written Opinion dated Mar. 29, 2016 for corresponding PCT Application No. PCT/GB2015/053778.
Notification of Reason for Rejected from corresponding Japanese application Serial No. JP2017-535867.

* cited by examiner

VACUUM PUMP LUBRICANT SUPPLY SYSTEMS

CROSS REFERENCE OF RELATED APPLICATION

This Application is a Section 371 National Stage Application of International Application No. PCT/GB2015/053778, filed Dec. 10, 2015, which is incorporated by reference in its entirety and published as WO 2016/110666 A1 on Jul. 14, 2016 and which claims priority of British Application No. 1500175.3, filed Jan. 7, 2015.

FIELD

The invention relates to vacuum pump lubricant supply systems.

BACKGROUND

Vacuum pumps typically comprise an impeller in the form of a rotor mounted on a rotor shaft for rotation relative to a surrounding stator. The rotor shaft is supported by a bearing arrangement that may comprise two bearings located at or intermediate respective ends of the shaft. One or both of these bearings may be a rolling bearing. Usually, the upper bearing is in the form of a magnetic bearing and the lower bearing is in the form of a rolling bearing.

A typical rolling bearing comprises an inner race fixed relative to the rotor shaft, an outer race and a plurality of rolling elements located between the races for allowing relative rotation of the inner race and the outer race. To prevent mutual contact between the rolling elements, they are often guided and evenly spaced by a cage. Adequate lubrication is essential to ensure accurate and reliable operation of rolling bearings. The main purpose of the lubricant is to establish a load-carrying film separating the bearing components in rolling and sliding contact in order to minimise friction and wear. Other purposes include the prevention of oxidation or corrosion of the bearing components, the formation of a barrier to contaminants and the transfer of heat away from the bearing components. The lubricant is generally in the form of either oil or grease (a mixture of oil and a thickening agent).

Vacuum pumps using oil-lubricated bearings require an oil feeding system for feeding oil between the contact areas of the bearing, which enables the oil to perform cooling as well as lubrication and thereby permit the bearings to run at a faster speed. Turbo-molecular pumps have traditionally used a wicking system for supplying oil to a rolling bearing. In such a system, a felt wick partially submerged in an oil reservoir feeds oil to a conical "oil feed" nut mounted on the shaft. When the shaft rotates, oil travels along the conical surface of the nut to the bearing. The oil then passes through the bearing and is returned to the reservoir.

The feed rate of oil to the bearing may be affected by a number of factors, including the taper angle of the conical nut, the rate of transfer of oil from the wick to the nut, the surface finish of the conical surface of the nut, temperature and the speed of rotation of the shaft. Consequently, the degree of control over the oil feed rate may be relatively poor.

The discussion above is merely provided for general background information and is not intended to be used as an aid in determining the scope of the claimed subject matter. The claimed subject matter is not limited to implementations that solve any or all disadvantages noted in the background.

SUMMARY

A vacuum pump includes:
a housing;
a rotor shaft supported by a bearing arrangement for rotation relative to said housing;
a lubricant supply system; and
a lubricant transfer device provided on said rotor shaft to transfer lubricant received from said lubricant supply system to a rolling bearing of said bearing arrangement,
wherein said lubricant supply system comprises a lubricant reservoir and a wicking element through which lubricant is transferred from said lubricant reservoir to said lubricant transfer device,
said wicking element comprises a body portion having an inner periphery and an outer periphery and a finger projecting from said inner periphery to engage said lubricant transfer device,
said lubricant reservoir has a major surface through which said lubricant is transferred to said body portion,
the body portion has a major surface facing said major surface of the lubricant reservoir to receive the lubricant transferred through said major surface of the lubricant reservoir, and
at least one of said inner periphery and said outer periphery is provided with at least one cut-out configured such that said major surface of the wicking element has a total surface area that is less that the total surface area of said major surface of the lubricant reservoir.

In accordance with a further embodiment, a vacuum pump lubricant supply system includes:
a lubricant reservoir; and
a wicking element that comprises a body portion having an inner periphery, an outer periphery and opposed major surfaces and at least one finger projecting from said inner periphery,
wherein said lubricant reservoir comprises a lubricant container that has a major surface engaging one of said opposed major surfaces of said body portion so that lubricant can migrate through said engaging major surfaces into said body portion,
said at least one finger projects from said inner periphery to, in use, engage a lubricant transfer device provided on a rotor shaft of a vacuum pump so that lubricant can wick from said body portion to said lubricant transfer device via said at least one finger, and
at least one of said inner periphery and said outer periphery is provided with at least one cut-out so that said major surface of said body portion that engages said major surface of said lubricant container has a total surface area that is less than the total surface area of said major surface of said lubricant container.

In accordance with a still further embodiment, a method of manufacturing a vacuum pump lubricant supply system includes:
providing a lubricant reservoir;
providing a wicking element with a body portion having an inner periphery, an outer periphery and opposed major surfaces and a finger projecting from said body portion through which, in use, lubricant can travel from said body portion to an element on a vacuum pump rotor shaft engaged by said finger;
disposing a said major surface of said body portion in flow communication with a facing major surface of said lubricant reservoir so that lubricant can flow from said lubricant reservoir into said body portion through said major surfaces; and providing at least one of said inner periphery and said outer periphery with at least one cut-out arranged to provide a restricted lubricant flow path from said body portion into said finger to limit lubricant flow into said finger, whereby said major surfaces of said body portion each have a total surface area that is less than the total surface area of said major surface of said lubricant reservoir.

In accordance with a further embodiment, a vacuum pump includes:

a housing;

a rotor shaft supported by a bearing arrangement for rotation relative to said housing; and a lubricant supply system to lubricate a rolling bearing of said bearing arrangement, wherein said lubricant supply system comprises a lubricant reservoir and a wicking element through which lubricant is transferred from said lubricant reservoir to said rolling bearing via an element provided on said rotor shaft, said wicking element comprises a body portion to receive lubricant from said lubricant reservoir and a finger projecting from said body portion to engage said element provided on the rotor shaft, and said body portion has an outer periphery that is provided with a cut-out opposite said finger to define oppositely disposed constricted lubricant flow paths from said body portion into said finger.

In accordance with a still further embodiment, a vacuum pump lubricant supply system includes:

a lubricant reservoir; and a wicking element that comprises a body portion and at least one finger, wherein said lubricant reservoir comprises at least one lubricant container engaging said body portion so that lubricant can migrate from said lubricant container into said body portion, said finger projects from said body portion to, in use, engage an element of a rotor shaft so that lubricant can wick from said body portion to said element of the rotor shaft via the at least one finger, and said body portion has an outer periphery that is provided with a cut-out opposite said finger to define oppositely disposed constricted lubricant flow paths from said body portion into said finger.

In accordance with a still further embodiment, a method of manufacturing a vacuum pump lubricant supply system includes:

providing a lubricant reservoir;

providing a wicking element in flow communication with said lubricant container so that lubricant can flow from said lubricant reservoir into a body portion of said wicking element;

providing said wicking element with a finger through which, in use, said lubricant can travel from said body portion to a portion of a vacuum pump rotor shaft engaged by said finger; and providing an outer periphery of said body portion with cut-out opposite said finger to define oppositely disposed constricted lubricant flow paths from said body portion into said finger.

In accordance with a further embodiment, a vacuum pump includes:

a housing;

a rotor shaft supported by a bearing arrangement for rotation relative to said housing;

a lubricant supply system; and a lubricant transfer device provided on said rotor shaft to transfer lubricant received from said lubricant supply system to a rolling bearing of said bearing arrangement, wherein said lubricant supply system comprises a lubricant reservoir comprising a first reservoir portion and a second reservoir portion and a wicking element disposed between said first and second reservoir portions, said first and second reservoir portions have respective major surfaces through which lubricant is transferred from said lubricant reservoir to said wicking element, said wicking element has a body portion having respective major surfaces engaging said major surfaces of the first and second reservoir portions to receive said lubricant transferred from said reservoir portions and a finger projecting from said body portion to engage said lubricant transfer device, and said body portion has an inner periphery and an outer periphery and at least one of said inner and outer periphery is provided with a cut-out through which lubricant can flow from a portion of said major surface of the first reservoir portion to a facing portion of the major surface of said second reservoir portion without passing into said body portion.

In accordance with a further embodiment, a vacuum pump lubricant supply system includes:

a lubricant reservoir; and a wicking element, wherein said lubricant reservoir comprises a first lubricant container and a second lubricant container that have respective major surfaces through which lubricant is transferred to said wicking element, said wicking element is disposed intermediate said first and second lubricant containers and has a body portion having respective major surfaces engaging said major surfaces of the first and second lubricant containers to receive said lubricant transferred from said lubricant containers and a lubricant transfer finger projecting from said body portion, and said body portion has an inner periphery and an outer periphery and at least one of said inner and outer periphery is provided with a cut-out through which lubricant can flow from a portion of said major surface of said first lubricant container to a facing portion of said major surface of said second lubricant without passing into said body portion.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

In the following disclosure, reference will be made to the drawings, in which.

DETAILED DESCRIPTION

Figure 1:
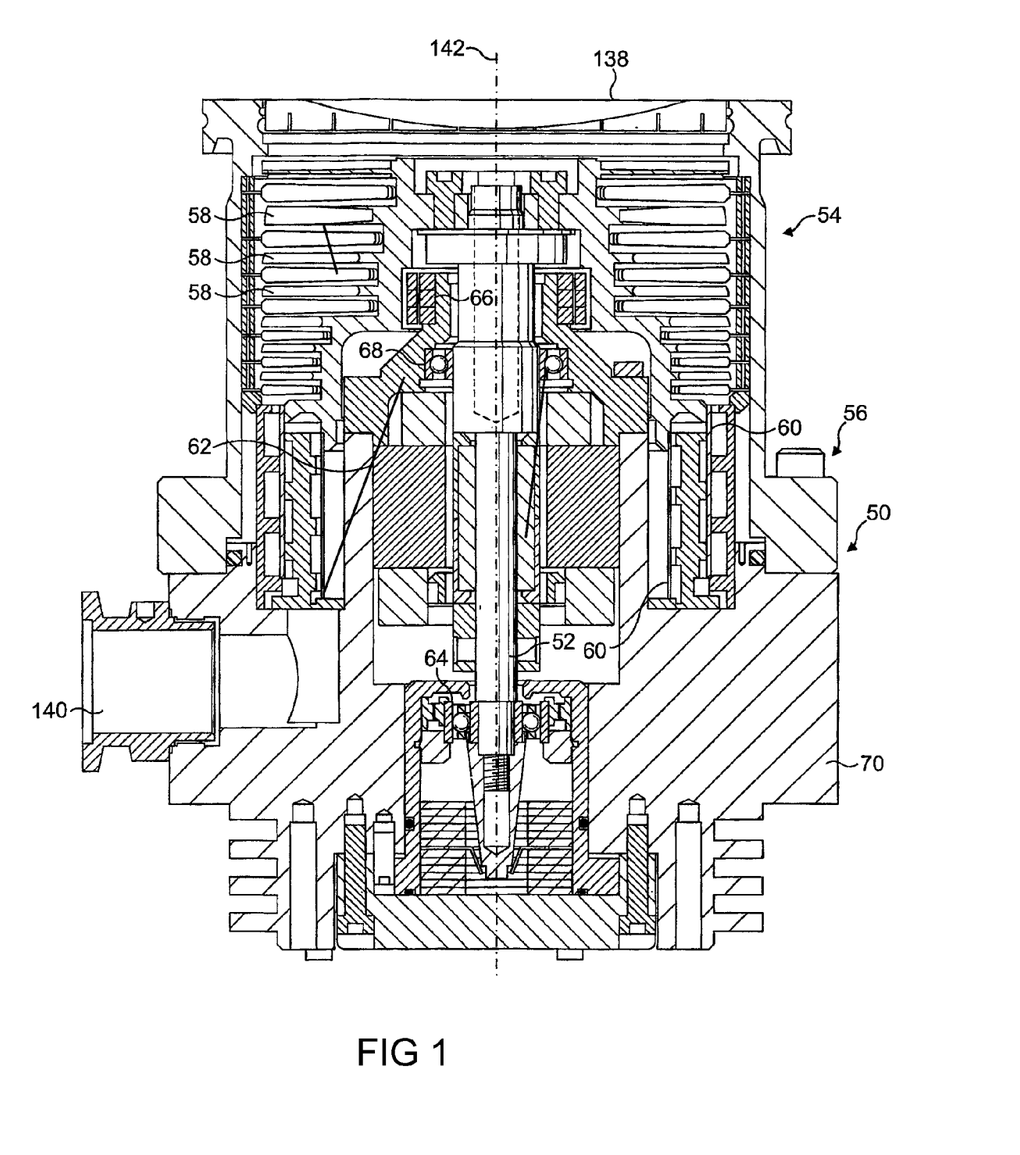
FIG. 1 is a cross-section view of a vacuum pump.

FIG. 1 is a cross-section view of an example of a vacuum pump 50. The vacuum pump 50 comprises a pumping arrangement driven by a rotor shaft 52. The rotor shaft 52 is driven by a motor 62. In the illustrated example, the vacuum pump 50 is a turbomolecular vacuum pump comprising a turbomolecular pumping mechanism 54 and a molecular drag pumping mechanism 56. The turbomolecular pumping mechanism 54 comprises a plurality of rotor blades 58 mounted on, or integral with, the rotor shaft 52. The molecular drag pumping mechanism 56 is in the form of a Holweck pumping mechanism and comprises one or more cylinders 60 mounted on the rotor shaft 52. The molecular drag pumping mechanism may alternatively comprise a Siegbahn mechanism comprising rotating discs. There may be additional, or alternative, mechanisms such as an aerodynamic pumping mechanism downstream of the molecular drag pumping mechanism comprising a regenerative mechanism.

The rotor shaft 52 is supported by a bearing arrangement comprising two bearings 64, 66. The bearings 64, 66 may be positioned at respective ends of the shaft 52 as shown, or alternatively, intermediate the ends. In the example illustrated by FIG. 1, a rolling bearing 64 supports a first end portion of the rotor shaft 52 and a magnetic bearing 66 supports a second end portion of the rotor shaft 52. A second rolling bearing may be used as an alternative to the magnetic bearing 66. When a magnetic bearing is used, a back-up rolling bearing 68 may optionally be provided.

Figure 2:
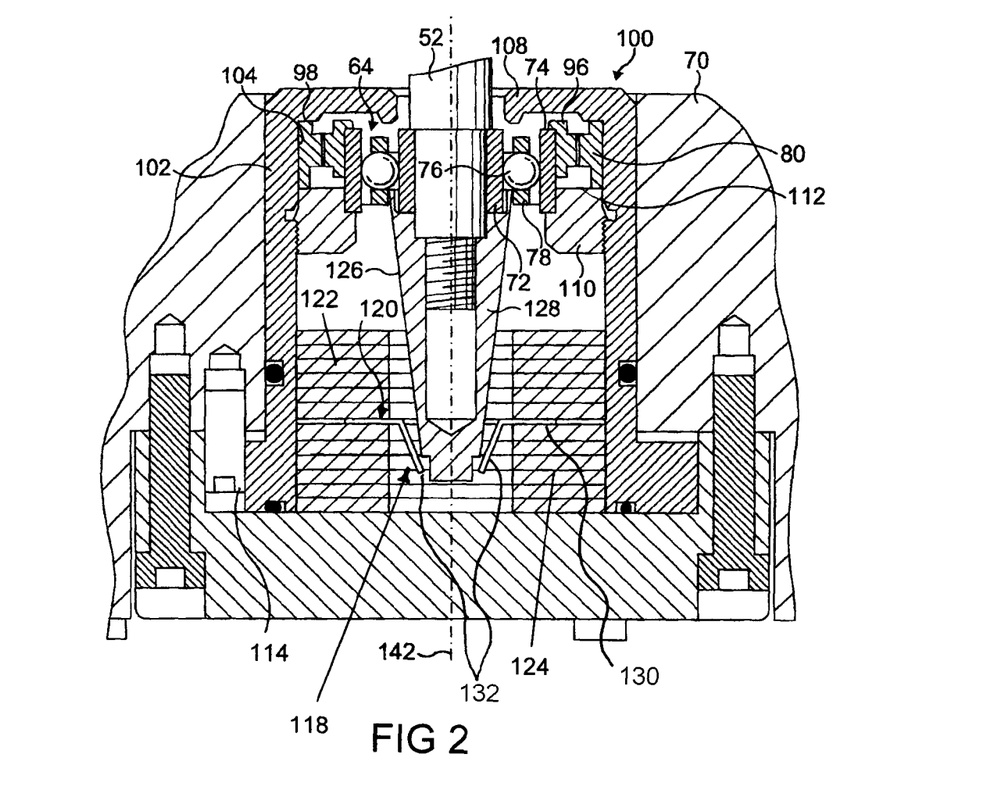
FIG. 2 is an enlargement of the lower end portion of the view shown in FIG. 1.

As best seen in FIG. 2, the rolling bearing 64 is provided between the first end portion of the rotor shaft 52 and a housing portion 70 of the vacuum pump 50. The rolling bearing 64 comprises an inner race 72 fixed relative to the rotor shaft 52, an outer race 74, a plurality of rolling elements 76 and a cage 78 configured to provide a desired spacing between the rolling elements. The rolling bearing 64 is configured to allow relative rotation of the inner and outer races 72, 74. The rolling bearing 64 is supplied with a lubricant to establish a load-carrying film that separates the rolling elements 76 from the inner and outer races 72, 74 to minimise friction and wear. The lubricant may be an oil.

Figure 3:
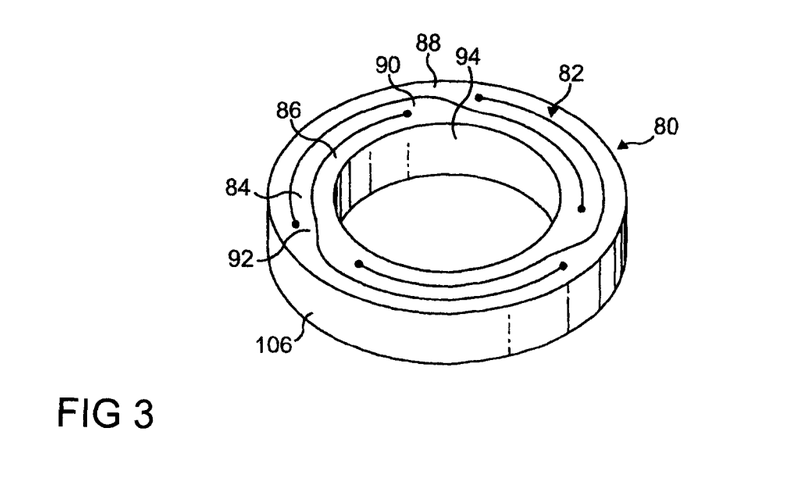
FIG. 3 is a perspective view of a resilient support of the vacuum pump of FIG. 1.

Optionally, a resilient support 80 is provided for supporting the rolling bearing 64 in both radial and axial directions relative to the housing portion 70. The resilient support 80 is configured to damp vibrations of the rotor shaft 52 and rolling bearing 64 during use of the vacuum pump 50. As best seen in FIG. 3, the resilient support 80 comprises a plurality of arcuate slots 82 that define a plurality of integral flexible members 84. Each flexible member 84 is located between an inner annular portion 86 and an outer annular portion 88 of the resilient support 80. Each flexible member 84 is connected to the inner annular portion 86 by a first resilient hinge 90 and to the outer annular portion 88 by a second resilient hinge 92.

Figure 4:
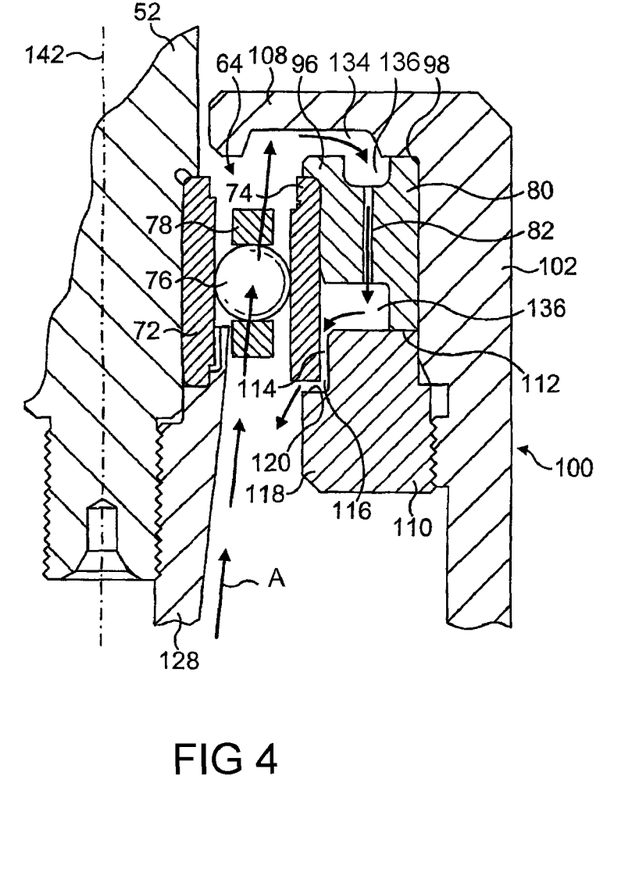
FIG. 4 illustrates in detail the supply of lubricant to a rolling bearing that is shown in FIG. 2.

Referring to FIGS. 2 to 4, a cartridge 100 is provided for retaining the resilient support 80 relative to the housing portion 70. The cartridge 100 has an axially extending wall 102 having an inner surface 104 that is in engagement with an outer, axially extending cylindrical surface 106 of the outer annular portion 88 of the resilient support 80. The cartridge 100 also has a radially inwardly extending wall 108 that has a lower (as illustrated) surface engaging the upper end surface 98 (FIG. 2) of the resilient support 80. A bearing nut 110 is attached to the inner surface 104 of the cartridge 100 by means of mutually-engaging screw threads such that an upper (as illustrated) end surface of the bearing nut 110 engages the lower end surface 112 of the resilient support 80 to retain the resilient support 80 within the cartridge 100 and, preferably, to axially pre-load the resilient support 80. The cartridge 100 is attached to the housing portion 70 by means of bolts 114 to secure the resilient support 80 relative to the housing portion 70.

The vacuum pump 50 is provided with a lubricant supply system 118 that comprises a wicking element 120 for supplying lubricant from a lubricant reservoir 122, 124 to a lubricant transfer device provided on the rotor shaft 52. In the illustrated example, the lubricant transfer device comprises a tapered surface 126 of a conical lubricant feed nut 128. The feed nut 128 is located on the end of the rotor shaft 52 adjacent the rolling bearing 64. The end of the feed nut 128 located closest to the rolling bearing 64 has an external diameter selected so that lubricant is delivered to a desired location in the rolling bearing. The external diameter may be approximately equal to the internal diameter of the cage 78. The wicking element 120 comprises a body portion 130 and at least one finger 132 extending from the body portion 130 into engagement with the tapered surface 126. The wicking element 120 may be shaped and configured so as to be the same as, or similar to, any of the wicking elements shown in FIGS. 6, 9 and 10, which are described in detail below. The wicking element 120 and lubricant reservoir 122, 124 may each be formed of a stable fibrous substrate such as felt.

When the rotor shaft 52 rotates, lubricant travels from the wicking element 120 onto the tapered surface 126 of the feed nut 128, which acts like a centrifugal pump. As indicated by the arrows A in FIG. 4, the lubricant travels along the feed nut 128 and into the lower (as illustrated) end of the rolling bearing 64. The lubricant is subsequently discharged from the upper end of the rolling bearing 64. An annular groove 134 is formed in the radially extending wall 108 of the cartridge 100 opposite the upper end of the rolling bearing 64 for deflecting lubricant discharged from the rolling bearing towards the resilient support 80. An annular groove 136 is formed in the upper end surface 98 of the resilient support 80 opposite the annular groove 134. The annular groove 136 defines a reservoir for receiving deflected lubricant from the annular groove 134. Lubricant received in the annular groove 136 feeds into the slots 82 under the influence of gravity. The lubricant in the slots 82 generates load-bearing damping films adjacent the inner and outer circumferential surfaces of the integral flexible members 84. If the rotor shaft 52 vibrates, the damping films are compressed thereby generating hydrodynamic pressure. The presence of lubricant maintained under pressure within the slots 82 has the effect of damping the vibrations, thereby attenuating the transfer of the vibrations to the housing portion 70 of the vacuum pump 50.

FIGS. 5 to 8 illustrate a lubricant supply system 218 that has many features similar to, or the same as, those of the lubricant supply system 118 shown in FIG. 2. Features of the lubricant supply system 218 similar to or the same as features of the lubricant supply system 118 have been assigned the same reference numeral, incremented by 100, and unless stated otherwise, the like features of the lubricant supply system 118 can be understood to operate in the same way as those of the lubricant supply system 218.

Figure 5:
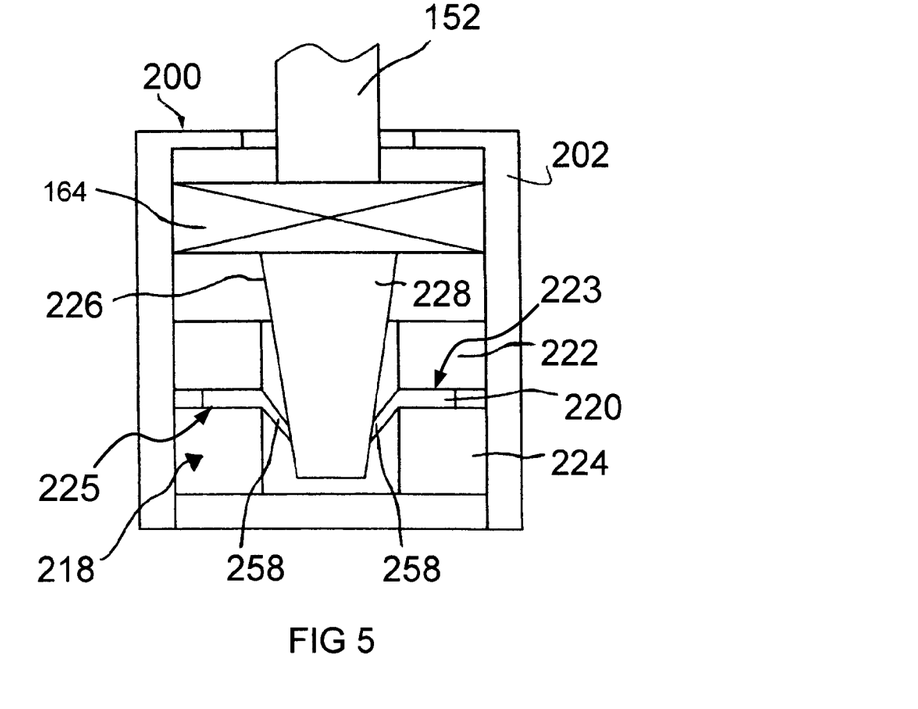
FIG. 5 is a schematic representation corresponding generally to the view shown in FIG. 2 showing a lubricant supply system of a vacuum pump.

In the arrangement shown in FIG. 5, the resilient support 80 has been omitted as it is not essential. The rolling bearing 164 may instead be mounted with its outer race directly engaging an axially extending annular enclosing wall 202 of a body 200. The body 200 may be a cartridge corresponding to the cartridge shown in FIG. 2 or any other suitable wall against which the rolling bearing 164 may be located. The enclosing wall may, for example, be a wall of the pump housing or a sleeve secured within the pump housing. The inner race of the rolling bearing 164 is secured to the rotor shaft 152 by means of a conical lubricant feed nut 228, which has a tapered surface 226. The tapered surface 226 tapers radially outwardly as it extends away from the free end of the rotor shaft 152 towards the rolling bearing 164. Portions of the tapered surface 226 disposed adjacent the rolling bearing 164 may be configured such that lubricant is directed into the rolling bearing on desired radius.

The lubricant system 218 comprises a wicking element 220 and a lubricant reservoir 222, 224. The lubricant reservoir comprises a first lubricant container 222 of a first reservoir portion and a second lubricant container 224 of a second reservoir portion. The wicking element 220 is disposed intermediate the first and second reservoir portions so that it can receive lubricant from each of the lubricant containers 222, 224. The wicking element 220 may comprise a relatively thin planar member made of a suitable porous material and may, for example, be made of a fibrous material such as felt.

Figure 6:
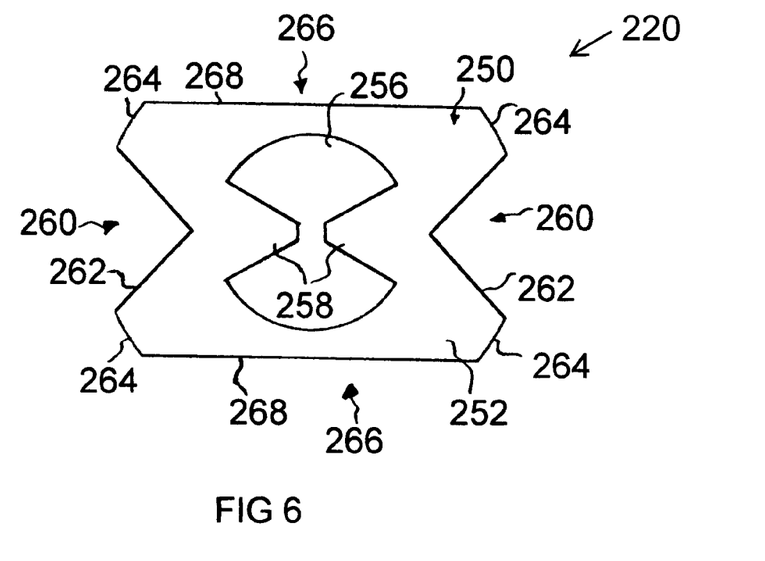
FIG. 6 is a plan view of a wicking element of the lubricant supply system shown in FIG. 5.
Figures 7, 8, 9:
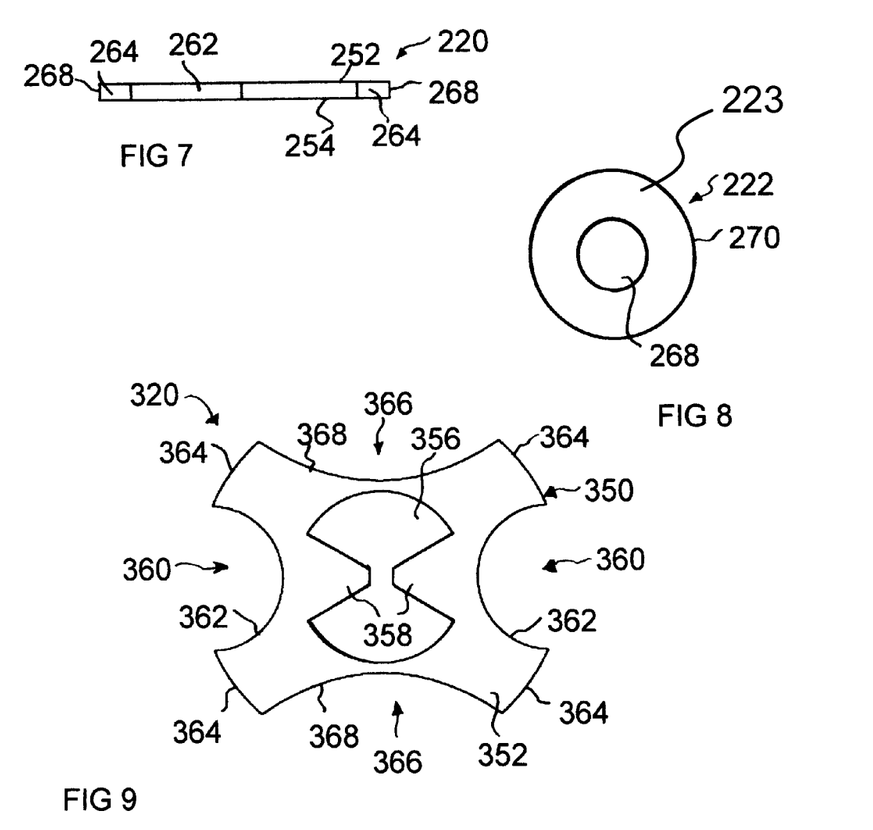
FIG. 7 shows an end elevation of the wicking element of FIG. 6.
FIG. 8 is a plan view of a reservoir portion of the lubricant supply system of FIG. 5.
FIG. 9 is a plan view of an alternative wicking element.

Referring to FIGS. 6 and 7, the wicking element 220 comprises a generally planar body portion 250 that has oppositely disposed major surfaces 252, 254. The body portion 250 has a centrally disposed aperture 256 through which the feed nut 228 extends. The aperture 256 defines an inner periphery of the body portion and is configured to define two fingers 258 that extend from the inner periphery into the aperture. The fingers 258 are configured to engage the tapered surface 226 of the feed nut 228. The fingers 258 may be configured to bend out of the plane of the body portion 250 when engaging tapered surface 226. In the illustrated example there are two fingers 258 disposed in opposed spaced apart relation. In other examples there may be just one finger or more than two fingers as required.

The body portion 250 portion has an outer periphery and two cut-outs 260 provided at the outer periphery generally in line with and radially outwardly of the fingers 258. The cut-outs 260 define first portions 262 of the outer periphery that are inclined with respect to, and extend inwardly of, second portions 264 of the outer periphery. The cut-outs 260 may be generally V-shaped as illustrated in FIG. 6. The second portions 264 of the outer periphery are arcs on a diameter corresponding at least substantially to the inside diameter of the annular enclosing wall 202. The configuration of the body portion 250 is such that the outer periphery has sufficient second portions 264 to locate and centre the wicking element 220 with respect to the rotor shaft 152 by engagement with an annular enclosing wall 202. Optionally the body portion 250 may have at least one further cut-out 266. The cut-out 266 defines a third portion 268 of the outer periphery. In the illustrated example there are two cut-out portions 266 arranged to define respective third portions 268 of the outer periphery. In this example the third portions 268 comprise two straight edges disposed in parallel spaced apart relation. The pair of cut-outs 266 may be disposed at right angles to the pair of cut-outs 260.

Referring to FIG. 8, which shows a bottom view of lubricant container 222, the lubricant container 222 is an annular body with a centrally disposed aperture 268 through which the feed nut 228 extends. The aperture 268 may have a diameter that is at least substantially equal to the diameter of the aperture 256. The lubricant container 222 has an outer periphery 270. The diameter of the outer periphery 270 may correspond at least substantially to the inside diameter of the annular enclosing wall 202 to locate and center the lubricant container with respect to the rotor shaft 152 and the wicking element 220. The lubricant container 222 comprises a porous structure so that it can hold lubricant and allow the lubricant to migrate to the wicking element 220 through a surface 223 that faces wicking element 220 and lubricant container 224. The first lubricant container 222 may comprise a plurality of lubricant container elements that combine to receive and hold lubricant and allow it to migrate to the wicking element 220. The lubricant container 222 may comprise a plurality of relatively thin planar pads made of, for example, felt stacked one upon another. In examples in which the wicking element 220 and lubricant container 222 comprise felt pads, the felt used for the two parts may have a different structure, or porosity, to assist in providing a controlled flow of lubricant from the first reservoir portion to the wicking element. The lubricant container 224 may correspond to the lubricant container 222 and similarly, may comprise a plurality of lubricant container elements stacked one upon another but with a top surface 225 that faces wicking element 220 and lubricant container 222 and through which lubricant migrates to wicking element 220.

In use, the lubricant containers 222, 224 are initially charged with a suitable lubricant, such as an oil. When the rotor shaft 152 is rotated to cause rotation of the attached pumping arrangement (not shown), the feed nut 228 rotates relative to the lubricant containers 222, 224 and the wicking element 220. Lubricant from the lubricant containers 222, 224 that has migrated into the wicking element 220 wicks along the fingers 258 onto the tapered surface 226 of the feed nut 228. The lubricant moves along the tapered surface 226 towards the rolling bearing 164. When the lubricant reaches the end of the feed nut 228 adjacent the rolling bearing 164 it is thrown into the bearing to lubricate the inner and outer races, the cage and the rolling elements of the bearing. The lubricant passes through the rolling bearing 164 and exits the top of the bearing 164, after which it is deflected down onto the lubricant container 222. The passage of the lubricant into the rolling bearing 164 and back to the lubricant reservoir 222, 224 may be essentially the same as is described for the lubricant supply system 118 with reference to FIG. 4. On entering the lubricant container 222, the lubricant migrates through the porous structure of the container towards the wicking element 220 for subsequent transfer to the feed nut 228 via the fingers 258. Some of the returned lubricant will pass through the cut-outs 260, 266 into the wicking element 220 to resupply the lubricant container 224.

Referring to FIG. 6, it has been found that by providing the wicking element 220 with a suitably configured cut-out, or cut-outs, the flow rate of the lubricant into the fingers 258, and so onto the feed nut 228, can be controlled. This may be due to one, or both of, the reduction in the respective contact areas between the first and second portions of the lubricant reservoir 222, 224 and the wicking element 220 and the constriction of the lubricant flow paths within the body portion 250. It has also been found that the cut-outs can facilitate the resupply of the second portion of the lubricant reservoir with lubricant returned from the rolling bearing 164 via the first reservoir portion. The cut-outs provide unobstructed lubricant flow paths between the lubricant container 222 and the lubricant container 224 that allow lubricant to pass from the lubricant container 222 into the lubricant container 224 without passing into the wicking element 220.

Referring to FIG. 9, an alternative wicking element 320 comprises a generally planar body portion 350 that has oppositely disposed major surfaces of which only one, the major surface 352, is visible in FIG. 9. The body potion 350 has a centrally disposed aperture 356, which is configured to define two fingers 358 that point inwardly of the inner periphery of the body portion. In use the fingers 358 engage an element of a lubricant transfer arrangement provided on a rotor shaft, such as a conical feed nut, to convey lubricant to the rotor shaft element. The fingers 358 may be configured to bend out of the plane of the body portion 350 when engaging the element of the lubricant transfer arrangement.

The body portion 350 has an outer periphery and is provided with two cut-outs 360 at the outer periphery that are disposed opposite and radially outwardly of the fingers 358. The cut-outs 360 have an arcuate profile and define respective first portions 362 of the outer periphery of the body portion 350. The first portions 362 of the outer periphery curve inwardly from second portions 364 of the outer periphery. The first portions 362 of the outer periphery have a maximum inward extent disposed generally in line with the longitudinal axes of the fingers 358. The second portions 364 of the outer periphery are arcs on a diameter corresponding at least substantially to the inside diameter of the annular wall 202. Optionally the body portion 350 has at least one further cut-out 366. In the illustrated example there are two cut-outs 366 that define respective third portions 368 of the outer periphery of the body portion 350. In this example, the first, second and third portions 362, 364, 368 of the outer periphery all have arcuate profiles.

Figure 10:
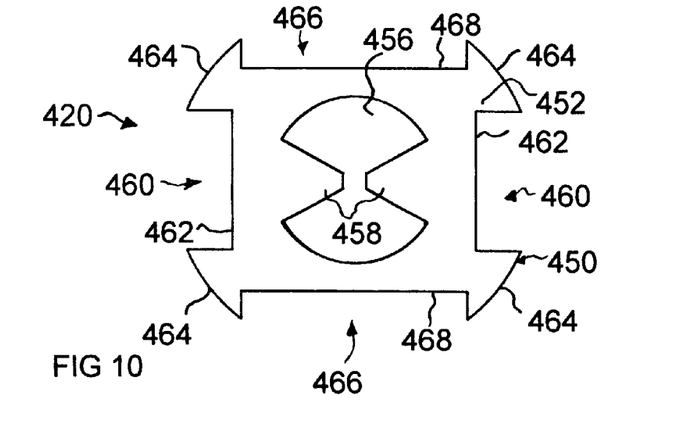
FIG. 10 is a plan view of yet another alternative wicking element.

Referring to FIG. 10, another alternative wicking element 420 comprises a generally planar body portion 450 that has oppositely disposed major surfaces of which only one, the major surface 452, is visible in FIG. 10. The body potion 450 has a centrally disposed aperture 456, which is configured to define an inner periphery of the body portion and two fingers 458 that point towards the centre of the body portion. In use the fingers 458 engage an element of a lubricant transfer arrangement provided on a rotor shaft, such as a conical feed nut, to convey lubricant to the element of the lubricant transfer arrangement. The fingers 458 may be configured to bend out of the plane of the body portion 450 when engaging the rotor shaft element.

The body portion 450 has an outer periphery and is provided with two cut-outs 460 at the outer periphery that are disposed opposite the fingers 458. The cut-outs 360 each have three straight sides defining an angular U-shaped profile and define respective first portions 462 of the outer periphery of the body portion 450. The first portions 462 of the outer periphery project inwardly with respect to adjacent second portions 464. The second portions 464 of the outer periphery are arcs on a diameter corresponding at least substantially to the inside diameter of the annular wall 202. Optionally the body portion 450 has at least one further cut-out 466. In the illustrated example there are two cut-outs 466 that define respective third portions 468 of the outer periphery of the body portion 450. The cut-outs 466 each have three straight sides, or edges, defining an angular U-shaped profile. The cut-outs 460, 466 may be arranged to alternate at 90° intervals about the periphery of the main body portion.

The lubricant supply systems 118, 218 comprise lubricant reservoirs that have first and second reservoir portions separated by a wicking element. The lubricant reservoir portions and wicking element have respective centrally disposed apertures. When the lubricant reservoir portions and wicking element are assembled, the respective apertures are at least substantially aligned to define a passage, or a chamber, that receives a portion of the rotor shaft. The wicking element has at least one finger disposed in the passage that extends from a body portion of the wicking element to contact a lubricant transfer surface provided on the rotor shaft so that lubricant can be wicked from the lubricant reservoir portions onto the lubricant transfer element, or surface, via which lubricant is transferred to the rolling bearing. The first and second reservoir portions and the wicking element each have outer peripheral portions on a common radius so that they can be aligned and centred with respect to the rotor shaft. Centring of the parts may be by engagement with a surface, or surfaces, fixed in the vacuum pump, such as a wall of a cartridge or sleeve or part of the pump housing. The wicking element is provided with at least one cut-out configured to assist in controlling the flow of lubricant to the wicking element finger(s). The cut-out(s) may define a constricted flow path adjacent a wicking element finger to restrict the flow of lubricant from the body portion of the wicking element into the finger.

In the illustrated examples, the central apertures of the first and second reservoir portions and the wicking element have at least substantially the same diameter and their outer peripheries are on at least substantially the same radius so that the surface areas of the major surfaces of the wicking element body portion and the respective facing, engaging, surfaces of the reservoir portions are potentially the same. However, by providing at least one cut-out in the body portion of the wicking element, the surface area of the wicking element available to receive lubricant from the lubricant reservoir is reduced, thereby restricting the flow of lubricant into the wicking element. By suitably selecting the position and size of the cut-out(s), the flow of lubricant to the wicking element finger(s) can be controlled, or tuned, to optimise the supply of lubricant to the bearing element and so, for example, at least reduce the likelihood of an over supply of lubricant to the rolling bearing.

The cut-out(s) can also provide a lubricant flow path between the first and second reservoir portions through which lubricant can flow from one reservoir portion to the other without passing into the wicking element. It can be seen that in the illustrated examples the cut-outs define respective flow paths in the form of voids though that allow unobstructed lubricant flow between the reservoir portions. In examples in which the reservoir portions are arranged in a stack so that one is above another, this aids the transfer of lubricant from the upper of the two reservoir portions to the lower reservoir portion. In examples in which lubricant supplied to the rolling bearing element is subsequently returned to the upper of the two reservoir portions, this aids the resupply of the lower reservoir portion, which allows a more even recirculation of the lubricant and reduces the need to take the vacuum pump out of service to recharge the lubricant reservoir.

In the illustrated examples the cut-outs are provided at the outer periphery of the body portion of the wicking element. Alternatively, or additionally, the cut-outs may be provided at the inner periphery of the body portion. In addition to providing one or more cut-outs at the inner or outer periphery of the body portion, further cut-outs may be provided within the body portion as through-holes.

In the illustrated examples the wicking elements are disposed between two reservoir portions of a lubricant reservoir such that they are disposed mid-way along the length of the reservoir. It will be understood that this is not essential and that the reservoir portions may be configured such that the wicking element is disposed at a desired location away from the mid-way point.

It will be understood that the wicking element can be readily formed by stamping, or otherwise cutting, a suitable material such as a layer of felt. Accordingly, wicking elements with controlled lubricant flow paths can readily be designed and manufactured for new build vacuum pumps and older designs that are already in service.

It will be understood that a wicking element with a periphery provided with a cut-out configured to control lubricant flow may be supplied as a stand alone product, in combination with one or more lubricant containers or as an assembly with one or more lubricant containers supported by a body such as the cartridge shown in FIGS. 1 and 2.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A vacuum pump comprising:
a housing;
a rotor shaft supported by a bearing arrangement for rotation relative to said housing;
a lubricant supply system; and
a lubricant transfer device provided on said rotor shaft to transfer lubricant received from said lubricant supply system to a rolling bearing of said bearing arrangement,
wherein said lubricant supply system comprises a lubricant reservoir and a wicking element through which lubricant is transferred from said lubricant reservoir to said lubricant transfer device,
said wicking element comprises a body portion having an inner periphery and an outer periphery and a finger projecting from said inner periphery to engage said lubricant transfer device,
said lubricant reservoir has a surface through which said lubricant is transferred to said body portion,
the body portion has a surface facing said surface of the lubricant reservoir to receive the lubricant transferred through said surface of the lubricant reservoir, and
at least one of said inner periphery and said outer periphery is provided with at least one cut-out such that a perimeter of the body portion along the at least one cut-out contacts the surface of the lubricant reservoir and such that said surface of the wicking element has a total surface area that is less that the total surface area of said surface of the lubricant reservoir.

2. A vacuum pump as claimed in claim 1, wherein said lubricant reservoir comprises a first reservoir portion and a second reservoir portion, said first reservoir having said surface through which lubricant is transferred to said body portion and said second reservoir having a second surface through which lubricant is transferred to said body portion, said wicking element is disposed intermediate said first and second reservoir portions and has a second surface facing said surface of said second reservoir portion to receive lubricant transferred from said second reservoir portion and said at least one cut-out defines a flow path between said first reservoir portion and said second reservoir portion through which lubricant can flow from said first reservoir portion to said second reservoir portion without passing into said wicking element.

3. A vacuum pump as claimed in claim 1, wherein said lubricant reservoir further comprises an external wall, said outer periphery of said body portion is provided with a plurality of said cut-outs to define respective first portions of said outer periphery and said outer periphery includes a plurality of second portions disposed outwardly of said first portions and configured to engage said external wall to center said wicking element with respect to said rotor shaft.

4. A vacuum pump as claimed in claim 1, wherein a said cut-out is provided at said outer periphery opposite said finger to define a constriction in a lubricant flow path to said finger.

5. A vacuum pump as claimed in claim 4, wherein said wicking element comprises a second said finger projecting from said inner periphery and a respective oppositely disposed cut-out provided at said outer periphery and said finger and said second finger are disposed in diametrically opposed spaced apart relation.

6. A vacuum pump as claimed in claim 1, wherein said lubricant reservoir has an aperture, said body portion has an aperture, said apertures are aligned and said lubricant transfer device is received in said aligned apertures.

7. A vacuum pump lubricant supply system comprising:
a lubricant reservoir; and
a wicking element that comprises a body portion having an inner periphery, an outer periphery and opposed surfaces and at least one finger projecting from said inner periphery,
wherein said lubricant reservoir comprises a lubricant container that has a surface engaging one of said opposed surfaces of said body portion so that lubricant can migrate through said engaging surfaces into said body portion,
said at least one finger projects from said inner periphery to, in use, engage a lubricant transfer device provided on a rotor shaft of a vacuum pump so that lubricant can wick from said body portion to said lubricant transfer device via said at least one finger, and
at least one of said inner periphery and said outer periphery is provided with at least one cut-out such that a perimeter of the body portion along the at least one cut-out contacts the surface of the lubricant reservoir and so that said surface of said body portion that engages said surface of said lubricant container has a total surface area that is less than the total surface area of said surface of said lubricant container.

8. A vacuum pump lubricant supply system as claimed in claim 7, wherein said lubricant reservoir comprises a first reservoir portion and a second reservoir portion, said first reservoir portion having the surface through which lubricant can migrate into said body portion and said second reservoir portion having a second surface through which lubricant can migrate into said body portion, said body portion is disposed between said first and second reservoir portions such that said opposed surfaces of said body portion engage the surface of the first reservoir portion and the second surface of the second reservoir portion, respectively, and said at least one cut-out defines a flow path through which lubricant can flow from said first reservoir portion to said second reservoir portion without passing into said wicking element.

9. A vacuum pump lubrication system as claimed in claim 7, wherein said outer periphery is provided with a plurality of said cut-outs that define respective first portions of said outer periphery, said outer periphery comprises a plurality of second portions disposed outwardly of said first portions and said second portions are configured to align with an outer periphery of said lubricant reservoir for centering the wicking element with respect to said lubricant reservoir.

10. A vacuum pump lubrication system as claimed in claim 9, further comprising a member defining an enclosing wall and said second portions of said outer periphery of said body portion and said outer periphery of said lubricant reservoir engage said enclosing wall.

11. A vacuum pump lubrication supply system as claimed in claim 7, wherein said wicking element has two said fingers disposed in diametrically opposed spaced apart relation and respective said cut-outs provided at said outer periphery and disposed in line with said fingers.

12. A vacuum pump lubrication system as claimed in claim 7, wherein said lubricant reservoir has an aperture, said body portion has an aperture said apertures are aligned to define a passage to receive said lubricant transfer device and said at least one finger projects into said passage.

13. A method of manufacturing a vacuum pump lubricant supply system, said method comprising:
providing a lubricant reservoir;
providing a wicking element with a body portion having an inner periphery, an outer periphery and opposed surfaces and a finger projecting from said body portion through which, in use, lubricant can travel from said body portion to an element on a vacuum pump rotor shaft engaged by said finger;
disposing a said surface of said body portion in flow communication with a facing surface of said lubricant reservoir so that lubricant can flow from said lubricant reservoir into said body portion through the facing surface; and
providing at least one of said inner periphery and said outer periphery with at least one cut-out such that a perimeter of the body portion along the at least one cut-out contacts the surface of the lubricant reservoir and arranged to provide a restricted lubricant flow path from said body portion into said finger to limit lubricant flow into said finger, whereby said opposed surfaces of said body portion each have a total surface area that is less than the total surface area of said facing surface of said lubricant reservoir.

14. A method of manufacturing a vacuum pump lubricant supply system as claimed in claim 13, further comprising forming said lubricant reservoir and body portion as annular bodies having aligned through-holes defining a passage to receive said element on the vacuum pump rotor shaft.

15. A method of manufacturing a vacuum pump lubricant supply system as claimed in claim 13, further comprising providing said lubricant reservoir with first and second reservoir portions that each comprise a respective facing surface through which lubricant can flow from the respective reservoir portion into said body portion, disposing said body portion intermediate said first and second reservoir portions so that lubricant can flow from the first reservoir portion into the second reservoir portion via said at least one cut-out without passing into said wicking element.

* * * * *